US007894474B1

(12) United States Patent
Bell

(10) Patent No.: US 7,894,474 B1
(45) Date of Patent: Feb. 22, 2011

(54) REMOTE CONTROL OF AN ELECTRONIC DEVICE THROUGH DOWNLOADING OF A CONTROL INTERFACE OF THE ELECTRONIC DEVICE IN A MOBILE STATION

(75) Inventor: John Bell, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/393,942

(22) Filed: Sep. 10, 1999

(51) Int. Cl.
*H04J 3/16* (2006.01)
*H04B 7/00* (2006.01)

(52) U.S. Cl. ....................... 370/466; 455/41.2; 709/203

(58) Field of Classification Search ................. 370/338, 370/465, 467, 352, 401, 466; 709/203, 217, 709/222; 455/419, 420, 421, 41.2; 348/14.05; 340/825.72, 825.37, 825.24
See application file for complete search history.

(56) References Cited

U.S. PATENT DOCUMENTS

| | | | | |
|---|---|---|---|---|
| 5,204,768 | A * | 4/1993 | Tsakiris et al. | 340/825.72 |
| 5,614,906 | A * | 3/1997 | Hayes et al. | 340/825.37 |
| 5,636,211 | A | 6/1997 | Newlin et al. | 370/465 |
| 5,909,183 | A | 6/1999 | Borgstahl et al. | 340/825.22 |
| 5,949,351 | A | 9/1999 | Hahm | 340/825.22 |
| 6,088,340 | A * | 7/2000 | Buchholz et al. | 455/517 |
| 6,104,334 | A * | 8/2000 | Allport | 340/825.24 |
| 6,223,029 | B1 * | 4/2001 | Stenman et al. | 455/420 |
| 6,356,529 | B1 * | 3/2002 | Zarom | 370/466 |
| 6,490,291 | B1 * | 12/2002 | Lee et al. | 370/401 |
| 6,490,626 | B1 * | 12/2002 | Edwards et al. | 709/229 |
| 6,509,913 | B2 * | 1/2003 | Martin et al. | 455/566 |
| 6,587,684 | B1 * | 7/2003 | Hsu et al. | 370/401 |
| 6,661,784 | B1 * | 12/2003 | Nykanen | 370/338 |

FOREIGN PATENT DOCUMENTS

| | | |
|---|---|---|
| EP | 0838768 A2 | 4/1998 |
| WO | WO 9849818 | 11/1998 |
| WO | 9859282 A2 | 12/1998 |

OTHER PUBLICATIONS

Todd D. Hodes et al, Composable Ad-hoc Mobile Services for Universal Interaction, Aug. 2, 1997, MOBICOM 97.*
Japanese Abstract of Japan A 09153952, Date of Publication Jun. 10, 1997.
Microsoft Handbook "MSCE: TCP/IP Study Guide", SYBEX, 1997, pp. 3, 16-24, 421.
Bluetooth Spec. V. 1. OA, July 26, 1999, pp. 41-45, 191, 249, 325-336, 342-347, 387, 504-513.

* cited by examiner

*Primary Examiner*—Andrew Lee

(57) ABSTRACT

A wireless communication system includes a number of controllable electronic devices and a mobile station for communication with one of the controllable electronic devices through a short-range wireless communication link, when in-range with the one controllable electronic device. The mobile station includes a display screen and a browser. The mobile station and the one controllable electronic device form a client-server pair. Through the short-range wireless communication link, the client requests the server to download a control interface stored at the server. Upon downloading, a browser is used to navigate through control menu pages included in the control interface, and to post control parameter settings to the server. In the server, a program runs to interpret received control parameter settings, to invoke a control action in accordance with the received control parameter settings, and to instruct the client what to do next.

22 Claims, 4 Drawing Sheets

REMOTE CONTROL OF AN ELECTRONIC DEVICE THROUGH DOWNLOADING OF A CONTROL INTERFACE OF THE ELECTRONIC DEVICE IN A MOBILE STATION

BACKGROUND OF THE INVENTION

1. Field of the Invention

The present invention relates to a wireless communication system with a number of controllable electronic devices and a mobile station for remotely controlling such electronic devices through a short-range wireless communication link such a radio link, an infra-red link, or any other suitable wireless link. The mobile station can be dedicated to such remote control functionality or can be multifunctional device combining remote control functionality and other functionality such as cellular or cordless functionality, or the like.

The present invention further relates to a method of remotely controlling a controllable electronic device, to a mobile station and to a controllable electronic device in such a system.

2. Description of the Related Art

In the PCT Application WO 98/49818 a mobile station is disclosed with combined mobile telephony and remote control terminal functionalities. The mobile station can act as a remote control unit for a variety of peripheral devices accessible through some type of local area communication system or related communication system. The peripheral devices are remotely actuatable in response to a set of predetermined control commands. A control command module within the mobile station generates the variety of control commands to which the peripheral devices are responsive. The control commands are transmitted to the peripheral device via a wireless communication link that is set up between the peripheral device and the control command module. Local interfaces that apply a single communication protocol are included in electronic communication devices otherwise connected to an external communication network. Through the single communication protocol each of the local interfaces is capable of effecting wireless communication with the other local interface modules. In FIG. 4 of WO 98/49818, a local area communication system is shown with local communication links between a mobile radio station, and, through local interface modules, a variety of peripheral devices such as hands-free headsets, television sets, radio sets, VCRs, etceteras. Through the local interface modules the peripheral devices can also communicate with each other. A user of the mobile radio station enters control commands through a user interface of the mobile station. A command control module comprised in the mobile station processes the control commands. A variety of command formats may be used to control the peripheral device through some types of command module. Either standard wireless communication protocols or a propriety protocol, on a single local communication medium may be used. The local interface modules may be integrated in the housing of the mobile station or may be disposed in a separate housing such that it forms a plugable unit.

In the U.S. Pat. No. 5,636,211 a universal multimedia access device is disclosed. The universal multimedia device accesses a predetermined one of a number of multimedia applications using an appropriate Application Specific (AS)-module interfaced thereto. A multimedia network delivers diverse multimedia applications such as high-speed data access (Internet), phone service, energy management, home security, and video. A transceiver operates to transmit and receive RF signals associated with a predetermined one of the multimedia applications specified by the AS-module. The MM-device further comprises a processing unit in communication with the transceiver and the AS-module. The processor identifies the AS-module interfaced to the MM-device and determines the predetermined MM-application associated with the AS-module. The processing unit then commands the transceiver to communicate with the MM-network in a mode associated with the MM-application. The AS-module includes a corresponding AS-transceiver for communicating multimedia information with an application device coupled thereto. This multimedia information can include video signals, data signals, voice signals, and control signals. In an embodiment, the AS-module enables the universal MM-device to communicate analog or digital control signals between the MM-network and an application device such as a home control device or an energy control device. A suitable connector is included in the AS-module to facilitate connection with a control application device. The universal MM-access apparatuses are thus built as a common architectural implementation based on a multimedia access engine providing a MM-application programming interface to diverse applications, while employing an access method to gain access to/from the network. Each AS-module has an interface for removable "plug-and-play" installation in the universal MM-access apparatus, and a further interface for connecting and disconnecting appropriate application devices. The processing unit is comprised of a microprocessor that is operative to provide a programmable platform for the apparatus. The transceiver is tunable over a range of frequencies within a predetermined frequency spectrum of which portions are assignable to a variety of multimedia applications. Upon powering up, the processing unit identifies the application from an identification signal received from the AS-module. Next, the processing unit commands the transceiver into a predefined mode required by the previously identified application. A control AS-module interfaced to a MM-device may include a variety of control transceivers. A variety of wireless platforms may be utilized in the transceiver of the MM-device. The wireless transceivers can utilize frequency reuse.

Both in the PCT Application WO 98/49818 and in the U.S. Pat. No. 5,636,211, specific plugable interface modules need to be provided to interface a particular controllable electronic device to a device for controlling the electronic device, the controllable electronic devices having specific control interface with specific control commands. Once provided with a specific controllable interface module, the controllable electronic device can be controlled by configuring the controlling device accordingly, or by selecting a suitable set of control commands in the controlling device. Providing specific interface modules renders a system with many different controllable electronic devices complicated, inflexible, and expensive. In addition thereto, a universal control device becomes complicated and will require a large storage capacity to store a large number of different sets of control commands.

In the Japanese Abstract 09 153 952, a mobile terminal is disclosed to remotely control an electric appliance by using a mobile terminal call number. The user dials a control code to remotely control a switch of a lighting fixture, or the like. In a radio message, the control code is transmitted to a controller controlling electric appliances. The dialed controller checks whether the received control code is present in a lookup table. If so, the lighting fixture is switched on.

In the Microsoft® handbook, "MCSE: TCP/IP Study Guide", Sybex, 1997, pages 3, 16-24, and 421, basic principles are disclosed as to TCP/IP Protocols, and browsing through the Internet. As defined on page 3, a TCP/IP protocol suite is a Transmission Control/Internet Protocol set that an application can use to package its information for sending across a link. On pages 16-17, a physical data flow and a logical data flow are shown on a physical channel between system entities, basically in terms of the well-known OSI (Open System Interconnection) Reference model of layers, the OSI reference model distinguishing seven layers, a physical layer, a data link layer, a network layer, a transport layer, a session layer, a presentation layer, and an application layer. Depending on a particular application several layers may be combined to a single layer. In accordance with the OSI reference model, the physical data flow between system entities occurs through all layers between the entities, whereas the logical data flow is defined as a peer to peer communication between corresponding layers of the entities. As defined on page 421, a Uniform Resource Locator, a URL, is the standard naming convention on the Internet, a browser is tool for navigating and accessing information on the Internet, usually in the form of Web pages hosted by a server, an HTTP, HyperText Transport Protocol, is a protocol specification used by the browser to send requests and by the server to respond to the requests, and HTML, Hyper Text Markup Language, is the document standard for Internet Web pages.

In the Bluetooth Specification, "Specification of the Bluetooth System—Core", v1.0A, Jul. 26, 1999, pp. 41-45, 191, 249, 325, 328-330, 335-336, 342-347, 387, and 504-513, WAP, Wireless Access Protocol, in the Bluetooth Piconet is disclosed, and a general description of the Bluetooth system as related to WAP. In WAP communications, a client device communicates with a server device using the WAP protocols. A communication can be initiated by a client or by a server device. Upon initiation, a so-called Bluetooth Service Discovery Protocol is started to find the other one of the client/server pair. Client addressing is mainly done through Uniform Resource Locators, URLs, as used with Internet browsers. URLs are text strings that describe the document that is accessed. On page 508, a WAP Protocol Stack is shown, entities of the protocol stack further being defined on said pages 41-45, 191, 249, 325, 328-330, 335-336, 342-347, 387. On page 41, a general description of BT, Bluetooth, a short-range radio link, is given. On page 42, a BT piconet with masters and slaves is shown. On pages 43-45, the BT physical channel, with time slots, is shown. Page 45 describes types of links between masters and slaves, a master being a link initiator, and a slave being the device accessed by the master. Pages 191; 249; 325, 328-330, 335-336, 342-347; and 387 describe LMP messages; the L2CAP; the Service Discovery Protocol; and the RFCOMM protocol; respectively.

SUMMARY OF THE INVENTION

It is an object of the invention to provide a simple and flexible remote control device for controlling many different types of controllable electronic devices.

It is another object of the invention to provide a simple, intuitive user interface in such a remote control device.

It is still another object of the invention to provide a learning mechanism for such a remote control device such that a remote control device coming out of range of a particular controllable electronic device and in-range thereof thereafter still recognizes such a controllable electronic device.

In accordance with the invention, a wireless communication system is provided comprising a plurality of controllable electronic devices and a mobile station for communicating with one of said controllable electronic devices through a short-range wireless communication link, said mobile station comprising a display screen, a user input interface, and an access protocol browser operating in accordance with an access protocol, a method of remotely controlling said one controllable electronic device, said method comprising:

through said short-range wireless communication link, said mobile station requesting said controllable electronic device to download data representative of a control interface associated with said one controllable electronic device;

downloading of said data in a data format interpretable by said access protocol browser; and displaying on said display screen of said data as control interface menu pages representative of said control interface, said access protocol browser navigating through said control interface menu pages.

Preferably, the mobile station checks whether the one controllable electronic device has access control capability before requesting the controllable electronic device to download its control interface. Herewith, it is prevented that the mobile station unnecessarily accesses electronic devices not supporting downloading of a control interface.

Preferably, a mobile station reuses a downloaded control interface if, after having come out of range of a particular controllable electronic device comes in-range of the same controllable electronic device thereafter.

Preferably, the access protocol is a markup language reading and interpretation protocol and the data represent a markup language, such a WAP Protocol, and a WAP markup language as defined in said Bluetooth Standard. Such a browser is simple and easy to operate and requires a reduced storage capacity and a small display unit. This is of particular interest when incorporating the browser in a mobile station also incorporating telephony functionality such as cordless or cellular telephony functionality. Simple and low storage requiring methods do not unnecessarily exhaust a battery comprised in the mobile station. When implementing the remote control functionality in a device such as a laptop with a larger display unit, a more complex browser could be used, together with a more complex markup language such as HTML.

BRIEF DESCRIPTION OF THE DRAWING

Throughout the figures the same reference numerals are used for the same features.

DESCRIPTION OF THE PREFERRED EMBODIMENT

Figure 1:
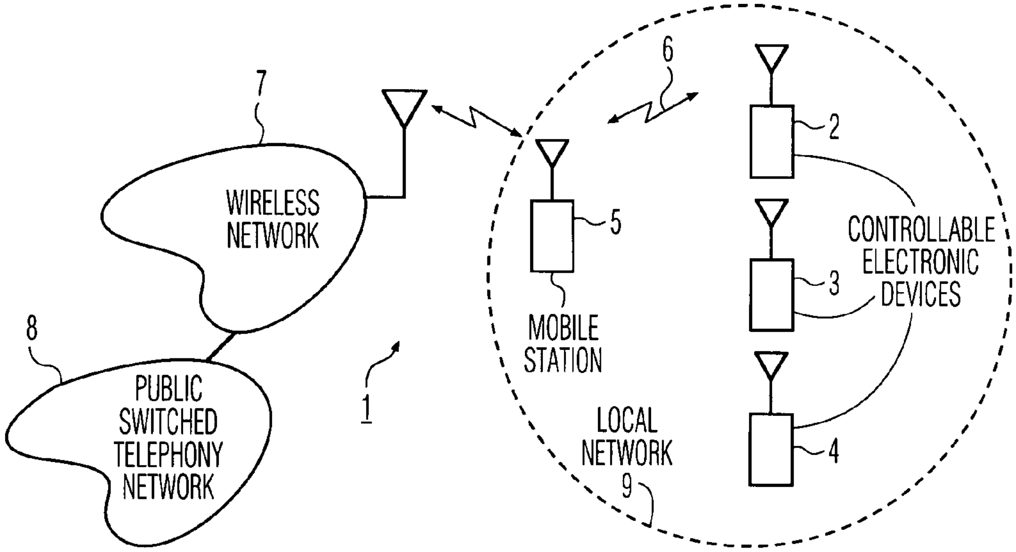
FIG. 1 shows a wireless communication system with a number of controllable electronic devices and a mobile station.

FIG. 1 shows a wireless communication system 1 with a number of controllable electronic devices 2, 3, and 4, and a mobile station 5. Shown is the mobile station 5 communicating with the controllable electronic device 2 through a short-range wireless communication link 6. In addition to communication with the controllable electronic device 2, the mobile station can be configured to communicate with a wireless network 7 such as a cellular or cordless telephony and/or data network. The mobile station 5 can also be configured to only communicate with the devices 2, 3, and 4. Then, the mobile station's 5 main functionality is a universal remote control terminal in accordance with the present invention. The wireless network 7 may be coupled to a public switched telephony network 8. The mobile radio station 5 in its capacity to communicate with the devices 2, 3, and 4, forms a local network 9 with the devices 2, 3, and 4. Preferably, the local network 9 is a network in accordance with said Bluetooth Specification. The short-range wireless communication link 6 can be a radio link, an infrared link, or any other suitable wireless link. The mobile station 5 may be configured to support both a short-range radio and a short-range infra-red link so as to communicate with controllable electronic devices capable of transmitting through only a radio link or only an infra-red link.

Figure 2:
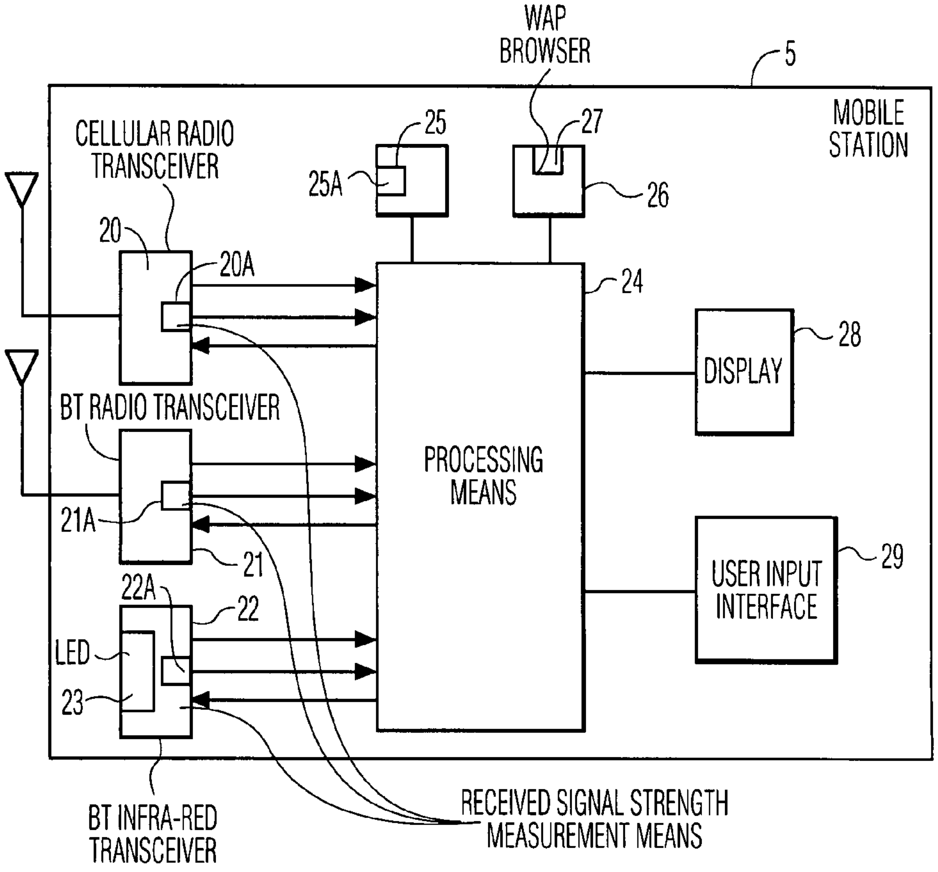
FIG. 2 shows a functional block diagram of a mobile station in accordance with the present invention.

FIG. 2 shows a functional block diagram of the mobile station 5 in accordance with the present invention. The mobile station 5 comprises a cellular radio transceiver 20, a Bluetooth (BT) radio transceiver 21, and a BT infrared transceiver 22 with a Light Emitting Diode (LED) 23 for transmitting and receiving modulated infrared signals. The transceivers 20, 21, and 22 comprise receive and transmit circuitry, including mixers, modulators, demodulators, analog-to-digital converters, and digital-to-analog converters so that the transceivers transmit digital signals generated by processing means 24 and provide digital signals to the processing means 24. Such transceiver circuitry is well known and is not shown in detail here. The BT transceivers 21 and 22 are configured to operate in accordance with said Bluetooth Specification. The mobile station 5 further comprises a random access memory (RAM) 25 for storing volatile data with a memory part 25A for storing non-volatile data, a ROM-memory 26 comprising a wireless access protocol browser 27, a display 28, and a user input interface 29, the RAM 25, the ROM 26, the display 28, and the user input interface 29 being coupled to the processing means 24. The transceivers 20, 21, and 22 respectively comprise received signal strength measurement means 20A, 21A, and 22A.

Figure 3:
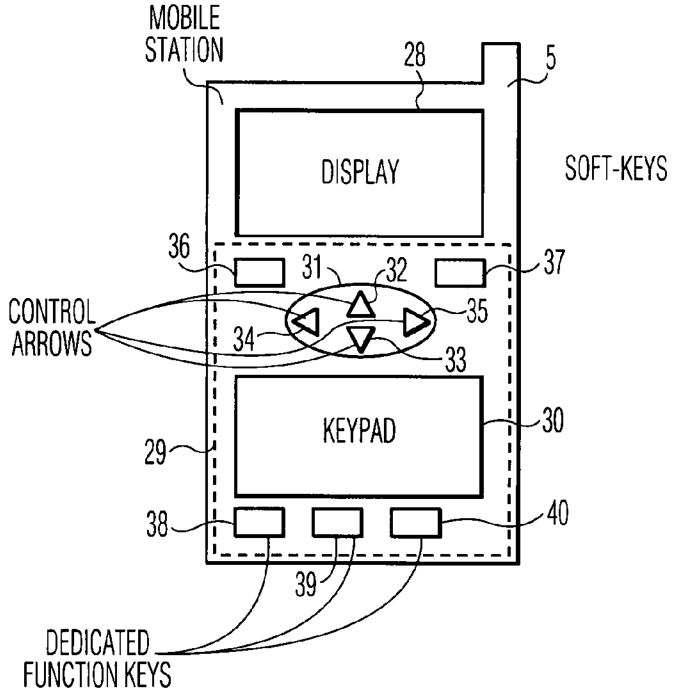
FIG. 3 shows a front view of a mobile station.

FIG. 3 shows a front view of the mobile station 5. Shown are the display 28, and the user input interface 29 comprising a keypad 30, a cursor control means 31 including up, down, left, and right control arrows 32, 33, 34, and 35, a left soft-key 36, a right soft-key 37, and dedicated function keys 38, 39, and 40. The dedicated function key 38 can be used to invoke the remote control functionality of the mobile station 5. The dedicated function keys 39 and 40 can be assigned to invoke control of often used devices, such as a TV set or a Stereo apparatus. Alternatively, the remote control functionality can be invoked by simultaneously actuating two ordinary keys of the keypad 30, such as the "*" and "#" keys. When the mobile station 5 is a dedicated remote control device, the remote control functionality can be invoked automatically through Bluetooth mechanisms when the station 5 is in-range of a controllable electronic device.

Figure 4:
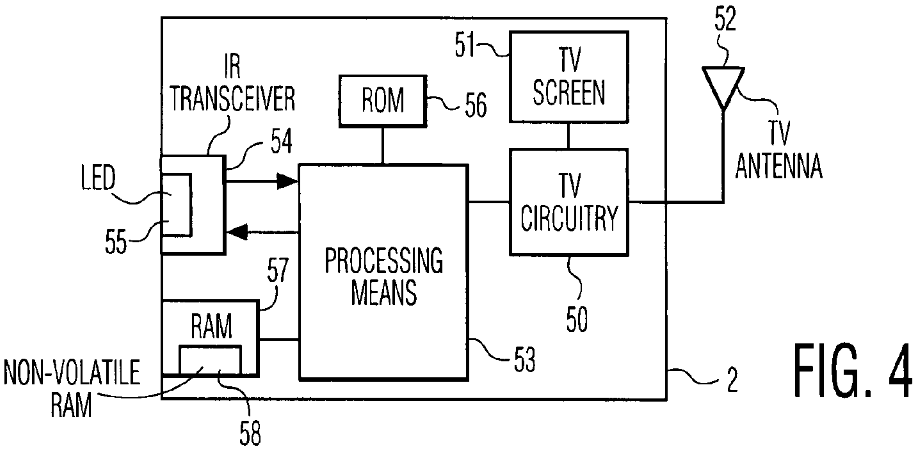
FIG. 4 shows a functional block diagram of a first controllable electronic device according to the invention.

FIG. 4 shows a functional block diagram of the controllable electronic device 2 according to the present invention. The controllable electronic device 2 is a television set with TV circuitry 50 coupled to a TV screen 51, and with a TV antenna 52 and processing means 53. The TV set 2 further comprises an infra-red transceiver 54 with a LED 55, a ROM 56, and a RAM 57 including a non-volatile RAM 58, the IR-transceiver 54, the ROM 56, and the RAM 57 being coupled to the processing means 53. As far as implementing the features according to the present invention, the IR-transceiver 55 and the processing means 53 operate in accordance with said Bluetooth Specification modified to use infrared. The non-volatile RAM 58 is intended to store control settings of the television set 2 such as selected channel, volume, brightness, contrast, and color. To this end the non-volatile RAM 58 has storage locations for storing these control settings, the TV set being controlled in accordance with current settings.

Figure 5:
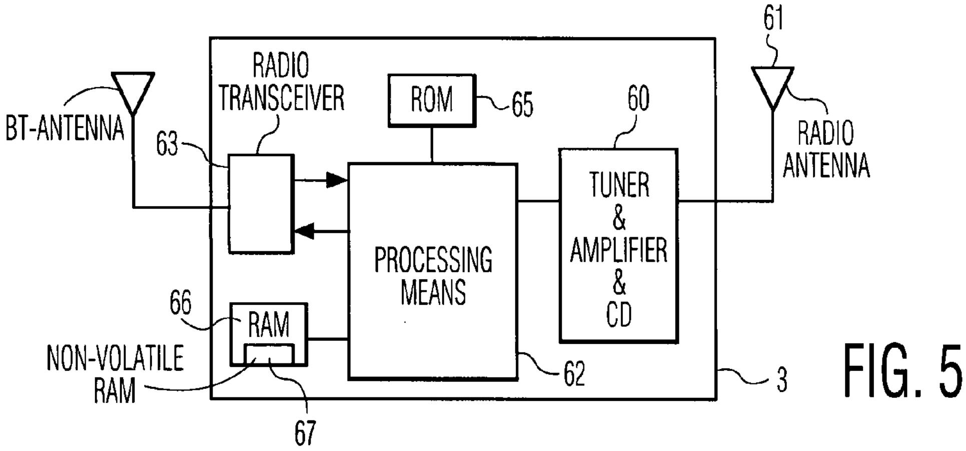
FIG. 5 shows a functional block diagram of a second controllable electronic device according to the invention.

FIG. 5 shows a functional block diagram of the controllable electronic device 3 according to the present invention. The controllable electronic device 3 is a tuner, amplifier, and compact disk player combination comprising tuner and amplifier and CD circuitry 60 coupled to a radio antenna 61. The circuitry 60 is coupled to processing means 62. The combination 3 further includes a BT-transceiver 63 coupled to a BT-antenna 64, a ROM 65, and a RAM 66 including a non-volatile RAM 67, the BT-transceiver 63, the ROM 65, and the RAM 66 being coupled to the processing means 62. As far as implementing the features according to the present invention, the BT-transceiver 63 and the processing means 62 operate in accordance with said Bluetooth Specification. The non-volatile RAM 67 is intended to store control settings of the combination 3 such as selected channel, volume, bass, treble, play, stop, pause, fast forward, etceteras. To this end the non-volatile RAM 67 has storage locations for storing these control settings, the combination being controlled in accordance with current settings.

The controllable electronic devices according to the present invention include all kinds of devices such as the shown TV set 2 and the shown combination 3, and also, but not limitative, a domestic appliances such as a microwave oven, or any other controllable device implementing the features according to the present invention.

Figure 6:
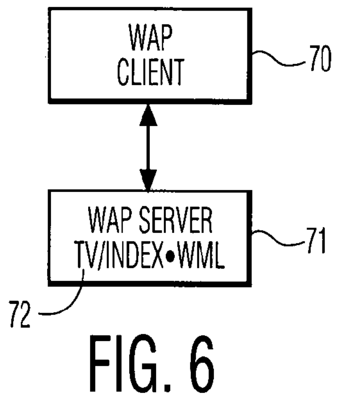
FIG. 6 shows basic operation of the mobile station as a remote control device.

FIG. 6 shows basic operation of the mobile station 5 as a remote control device. Block 70 shows the mobile station 5 as Wireless Access Protocol (WAP) client and block 71 shows the controllable electronic device 3, that is a TV set, as a WAP server. In terms of WAP, the TV set 3 and the mobile station 5 form a server/client relationship. In terms of Bluetooth, depending on the device initiating a Bluetooth link, either the server or the client is a master, the other one of the server/client then being a slave. In the server/client relationship, the client sends requests to the server, and the server responds to such requests. WAP is used by the mobile station 5 to control the controllable electronic devices 2, 3, and 4. During Bluetooth link setup between the mobile station 5 and a controllable electronic device, a Bluetooth Service Discovery Protocol is started as defined on pages 328-330, 335-336, 342-347 of said Bluetooth Core. First it is checked whether the controllable electronic device has WAP capability. If so, the server is requested to provide details of the WAP service in the form of service attributes as defined on page 330 of said Bluetooth Core, an essential attribute being a home page URL 72 referring to a file with remote control menu pages, the URL tv/index.wml. As defined on page 330 of said Bluetooth Core, a service record in the server 71 containing the attributes is unique to this particular server through a so-called service record handle, a 32-bit identification number that uniquely identifies a service record within the server 71. Each handle is unique only within each SDP server. The handle used to reference the service on the server 71 will be meaningless if presented to another server. Upon link setup and service discovery, the mobile station 5 automatically opens the browser 27, and, using the URL text string tv/index.wml, requests the server 71 to download the file to which tv/index.wml refers in the server 71. The WAP browser 27 is used to navigate the downloaded menu pages. When more menu pages or other information are/is needed, the mobile station 5 requests the server 71 to provide such pages or information. The downloaded file contains a first small screen display card that contains an initialization message such as "Philips TV REMOTE CONTROL", and current settings of the TV set 2. This card is only displayed on the mobile station for a short period of time, e.g., 1 second. Then, the WAP browser 27 moves to the next card, the next card being displayed on the display 28. Commands selected on the menu pages, such as a desired volume control setting are sent to the server 71 in the form of requests. The server 71 interprets such requests and acts accordingly, in the example given by updating a volume control memory location in the memory 58 setting the volume of the TV set 2, and responds to such requests by confirming the action taken. In case, after link setup and downloading of the file referred to by tv/index.wml, the mobile station 5 gets out-of-range of the controllable electronic device it controls, and thereafter gets in-range of the same controllable electronic device, downloading of the file referred to by tv/index-.wml can be dispensed with. In that case, the mobile station 5 can retrieve this file from the memory 25A where this file is stored at downloading. In terms of OSI layers, after starting up of the browser 27, peer to peer communications occur between Application layers of the mobile station 5 and the TV set 2. Other communications occur in lower layers, the described Service Discovery Protocol occurring in the OSI Session layer. Physically, all data between the mobile station 5 and the TV set 2 are exchanged through a bearer service. Information is exchanged through packets, e.g., using a serial port profile or a more complex object exchange profile as defined in the Bluetooth Specification.

When the Service Discovery Protocol discovers more than one device, e.g., in a situation where two WAP capable BT-devices are placed in close proximity with each other, such a device conflict can be solved in several ways. In a semi-automatic method to select a desired controllable electronic device, after the Service Discovery Protocol found, e.g., two devices such as the devices 2 and 3, the user of the mobile station 5 is offered a choice to manually select one of the devices 2 and 3 that should be controlled. After such a manual selection, the index-file of the selected device is downloaded. Another method to select one of the devices makes use of the BT-capability that a device can remember BT-links. In a situation that, when in-range, the mobile station 5 finds two controllable electronic devices, it stores the BT-links of these two devices in the memory 58. When coming into range of these two devices again, after first having been out-of-range of these two devices, the user configures the mobile station 5 of which stored BT-link the index file should be downloaded, and thus which controllable electronic device should be controlled. Also, after the Service Discovery Protocol discovered multiple in-range controllable electronic devices, multiple sets of cards for the discovered controllable electronic devices may be downloaded. In this embodiment, the identification numbers and URLs of the discovered electronic devices are stored into the memory 25A. Then, browser 27 can open multiple windows for such controllable electronic devices so that the user can select to control any one of the discovered controllable electronic devices.

Figure 7:
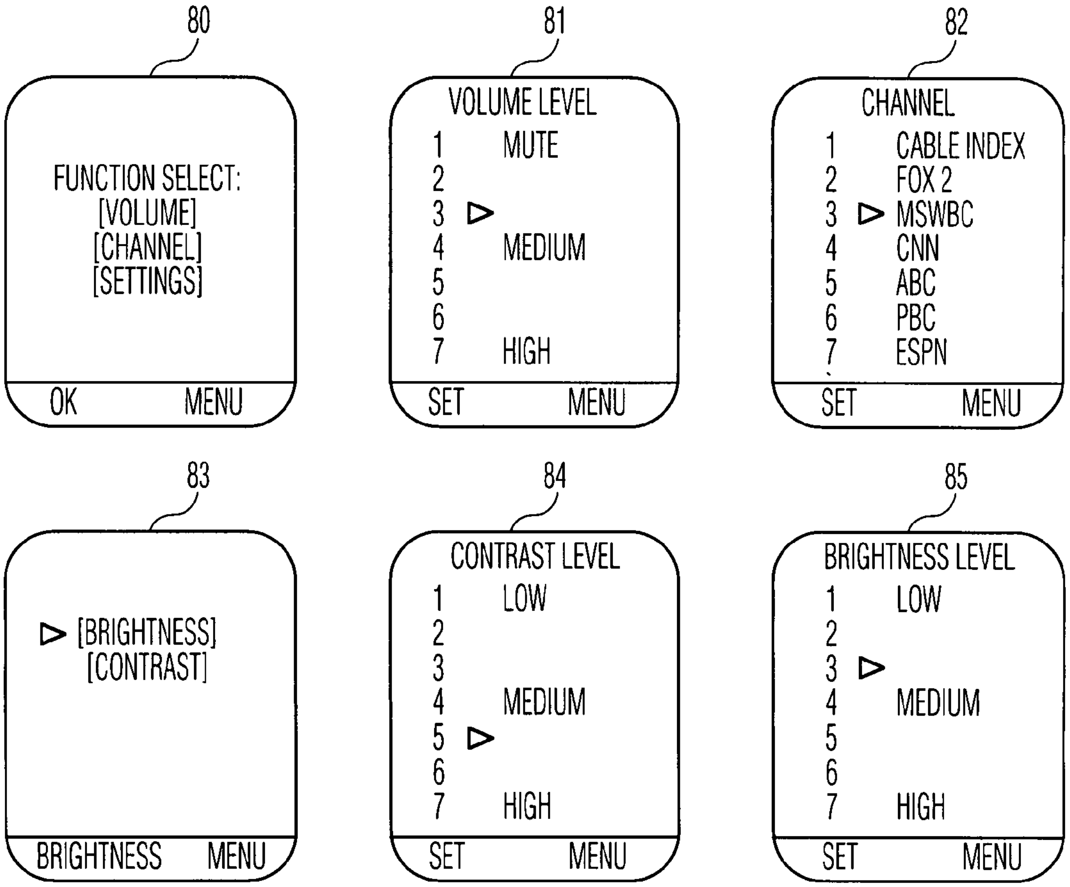
FIG. 7 shows six menu pages that are downloaded from a server.

FIG. 7 shows 6 menu pages 80, 81, 82, 83, 84, and 85 that are downloaded from the server 71 and that are displayed on the display 28 of the mobile station 5. The menu pages 80-85 is an example of the client application using WML (WAP Markup Language) interpreted by the WAP browser 27. The six menu pages or cards 80-85 allow a user of the mobile station 5 to navigate six screens. The screens 80-85 are defined as follows:

| | | |
|---|---|---|
| Screen 80: | "Function Select: | |
| | [Volume] | |
| | [Channel] | |
| | [Settings] | |
| | OK | Menu" |
| Screen 81: | "Volume Level | |
| | 1 Mute | |
| | 2 | |
| | 3 • | |
| | 4 Medium | |
| | 5 | |
| | 6 | |
| | 7 High | |
| | Set | Menu" |
| Screen 82: | "Channel | |
| | 1 Cable Index | |
| | 2 Fox 2 | |
| | 3 • MSWBC | |
| | 4 CNN | |
| | 5 ABC | |
| | 6 PBC | |
| | 7 ESPN | |
| | Set | Menu" |
| Screen 83: | "[Brightness] | |
| | [Contrast } | |
| | Brightness | Menu" |
| Screen 84: | "Contrast Level | |
| | 1 Low | |
| | 2 | |
| | 3 | |
| | 4 Medium | |
| | 5 • | |
| | 6 | |
| | 7 High | |
| | Set | Menu" |
| Screen 85: | "Brightness Level | |
| | 1 Low | |
| | 2 | |
| | 3 • | |
| | 4 Medium | |
| | 5 | |
| | 6 | |
| | 7 High | |
| | Set | Menu" |

The screen 80 is the first browser screen after the initial display of the controllable electronic device identification message that is displayed only once. The up and down arrows 32 and 33 are used to scroll up and down the screen 80 if needed, and to point to a desired menu item. The left soft key 36 corresponds to the labels projected above this key, such as "OK", "Set", and "Brightness". The right soft key 37 corresponds to the label "Menu" projected above this key. When operating on the screen 80, the user points to [Channel] and confirms this choice by actuating the left soft key 36. Then, the screen 82 is displayed where the user can select the desired channel. Accordingly, volume, contrast, and brightness settings can be chosen. The selected command or control parameter, such as set volume to setting "3", is conveyed to the TV set in the form of a request, as described before. The downloaded data may represent all control interface menu pages of the TV set 2. Alternatively, upon initial downloading, only a part of the control interface menu pages may be downloaded, further pages being downloaded on request from the client. The initial settings of the TV set may alternatively be requested from the server 71 after downloading of the menu page file. In order to prevent that the browser 27 retrieves previously stored pages rather than requesting new pages, when such new pages are required, the usual browser cache mechanism is disabled.

Figure 8:
FIG. 8 shows a file referred to by the URL tv/index.wml.

FIG. 8 shows a file 90, index.wml, referred to by the URL tv/index.wml. The file 90 contains the menu pages WAP ML, and initial information conveyed to the client 70. The content of the file 90 is as follows. Text in Italic represents comments not actually present in the file 90, explaining the meaning of several parts of the file 90.

```
"Required header information
<?xml version="1.0"?>
<!DOCTYPE wml PUBLIC "-//WAPFORUM/DTD WML 1.1//EN"
                    http://www.wapforum.org/DTD/wml 1.1.xml>
<wml>
Set up cache control for proper interaction with the server
<head>
    <meta http-equiv="Cache -Control" content="max-age=1"/>
<head>
Cause the word 'Menu' to appear above the right soft key 37 in
each card
<template>
    <do type="options" label="Menu">
        <go href="#Home"/>
    <do>
</template>
Create Initialization card. This is displayed for 1 second prior
to Card 1 being displayed. It also initialises the various
control settings.
<card title="First">
      <onevent type="ontimer">
        <go href="#Home">
            <setvar name="vol" value="2"/>
            <setvar name="chan" value="3"/>
            <setvar name="bright" value="4"/>
            <setvar name="cont" value="3"/>
        </go>
    </onevent>
    <timer value="10"/>
    <p>
        Philips TV<br/>REMOTE CONTROL
    </p>
</card>
Create card 1. Selecting one of the options causes card 2, 3, or
4 to be displayed
<card title="Main" id="Home">
    <p>
    Function Select:<br/>
    <anchor title="Volume">
        <go href="#volume"/> Volume
    </anchor><br/>
    <anchor title="Channel">
        <go href="#channel"/> Channel
    </anchor><br/>
    <anchor title="Settings">
        <go href="#settings"/> Settings
    </anchor><br/>
    </p>
</card>
Create card 4. Selecting one of the options causes card 5 or 6 to
be displayed
<card title="Settings" id="settings">
    <do type="accept" label=" ">
        <go href="#Home"/>
    </do>
    <p>
    <anchor tile="Brightness">
        <go href="#bright"/> Brightness
    </anchor><br/>
    <anchor title="Contrast">
        <go href="#contrast"/> Contrast
    </anchor><br/>
    </p>
</card>
Create card 2. Selecting one of the options causes a variable
called "Volume' to be posted to the server 71. The actions of the
server 71 are simplified in a Per1 script called remoteaction.cgi
```

-continued

```
<card title="volume" id="volume">
    <do type="accept" label="Set">
        <go href="remoteaction.cgi">
            <postfield name="Volume" value="$vol"/>
        </go>
    </do>
    <p align="center">
    Volume Level $vol
        <select name="vol" >
            <option value="1" >Mute</option>
            <option value="2" ></option>
            <option value="3" ></option>
            <option value="4" >Medium</option>
            <option value="5" ></option>
            <option value="6" ></option>
            <option value="7" >Maximum</option>
        </select>
    </p>
</card>
Create card 5. Selection of the options causes a variable called
'contrast' to be posted to the server 71.
<card title="contrast" id="contrast">
    <do type="accept" label="Set">
        <go href="remoteaction.cgi">
            <postfield name="contrast" value="$cont"/>
        </go>
    </do>
    <p align="center">
    Contrast Level $cont
        <select name="cont" >
            <option value="1" >Low</option>
            <option value="2" ></option>
            <option value="3" ></option>
            <option value="4" >Medium</option>
            <option value="5" ></option>
            <option value="6" ></option>
            <option value="7" >High</option>
        </select>
    </p>
</card>
Create card 6. Selecting one of the options causes a variable
called 'brightness' to be posted to the server 71.
<card title="bright" id="bright">
    <do type="accept" label="Set">
        <go href="remoteaction.cgi">
            <postfield name="brightness" value="$bright"/>
        </go>
    </do>
    <p align="center">
    Brightness Level $bright
        <select name="bright" >
            <option value="1" >Low</option>
            <option value="2" ></option>
            <option value="3" ></option>
            <option value="4" >Medium</option>
            <option value="5" ></option>
            <option value="6" ></option>
            <option value="7" >High</option>
        </select>
    </p>
</card>
Create card 3. Selecting one of the options causes a variable
called 'channel' to be posted to the server 71.
<card title="Channel" id="channel">
    <do type="accept" label="Set">
        <go href="remoteaction.cgi">
            <postfield name="channel" value="$chan"/>
        </go>
    </do>
    <p align="center">
    Channel $chan
        <select name="chan" >
            <option value="1" >Cable Index</option>
            <option value="2" >Fox 2</option>
            <option value="3" >MSNBC</option>
            <option value="4" >CNN</option>
            <option value="5" >ABC</option>
            <option value="6" >PBC</option>
            <option value="7" >ESPN</option>
```

-continued

```
        </select>
    </p>
</card>
</wml>"
End-of-file 90.
```

For bigger screens, instead of WML, HTML may be used.

Whenever a value is posted in cards 2, 3, 5, or 6, the file 'remoteaction.cgi' is called. The file 'remoteaction.cgi' is a program that runs on the server 71, and that is stored in the memory 56. This program interprets values posted by the client 70 and takes a proper control action in the TV set 2, and, thereafter, sends a new card to the client 70 to confirm the action. The new card instructs the client 70 to return to the previous card.

Figure 9:
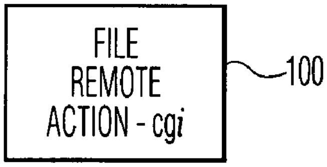
FIG. 9 shows a file run on the server.

FIG. 9 shows a file 100, 'remoteaction.cgi", used by a Perl Script Interpreter run on the server 71. The contents of the file 100 is as follows.

"This is a Perl script

#!/usr/local/bin/perl

#This script emulates the functionality of the TV Server with

#Volume, Channel, Brightness and Contrast Control

For simplicity reasons, only one variable is set—the location where data is to be stored. In a real implementation, memory locations in the memory 58 are defined for the control parameters.

Set Variables

In this emulation a file is written to. In an actual # implementation, memory locations in the memory 58 are addressed $logpath="wmltest.txt";

This part of the code extracts the data that was sent. For example if Volume=3 was sent this is put into the variable FORM as a pair such that $FORM{'Volume'}=3

Get form data

The following script interprets the commands posted by the client

This mechanism allows more than one variable to be sent at a time

(remote control)

read (STDIN, $buffer, $ENV{'CONTENTLENGTH'});

@pairs=split(/&/, $buffer);

foreach $pair (@pairs)

{

($name, $value)=split(/=/, $pair);

Un-Webify plus signs and %-encoding $value=~tr/+//;

$value=~s/%([a-fA-F0-9][a-fA-F0-9])/pack("C", hex ($1))/eg;

$FORM{$name}=$value;

}

Form data obtained

The variable FORM now has control data

This part of the code acts on the data. In this example the data is written to a file, but in a real implementation values are written to memory locations and change TV settings.

In this emulation the data will be recorded in a data file open (LOG, ">>$logpath");

foreach $key (keys(% FORM)) {print LOG "$key=$FORM{$key}\n;} close (LOG)

This last part of the script sends a new card to the client

Now the client needs to be instructed what to do print "Content-Type: text/vnd.wap.wml\n\n;

print <<EndWML;

The Cache-Control is very important as it forces the client 70 to request a new card from the server 71.

```
<?xml version="1.0"?>
<!DOCTYPE wml PUBLIC "-//WAPFORUM//DTD 1.1//EN"
     http://www.wapforum.org/DTD/wml 1.1.xml">
<!-- Main menu for WML examples -->
<wml>
This card is a simple instruction to return to the previous card.
<head>
     <meta http-equiv="Cache-Control" content="max-age=0/>
</head>
     <card title="Action" id="Home">
<onevent type="onenterforward">
<prev/>
</onevent>
     <p>
     Control Set
     </p>
     </card>
</wml>
EndWML
;"
End-of-file-100.
```

Because the server sends a file to the client, a very flexible system is obtained for sending a simple or an advanced control interface to the client. I.e., by using a markup language, the manufacturer of the TV set 2 is allowed to define its own control interface and to easily download such a control interface to the remote control device.

Figure 10:
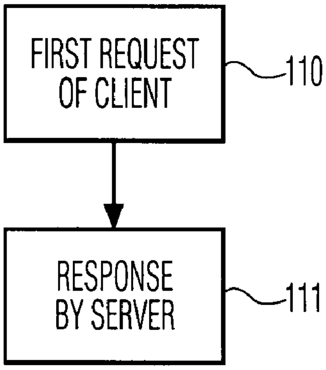
FIG. 10 shows a first request of the client, and a response from the server, in HTTP-format.

FIG. 10 shows a first request of the client 70, and a response from the server 71, in HTTP-format.

First request of client, in HTTP-format:
"GET http://tv/index.wml HTTP/1.1"

Response by server, in HTTP-format:
"CONTENT TYPE=Text/wml
CONTENT LENGTH=file length of the included file The file index.wml stored in the memory 56"

Figure 11:
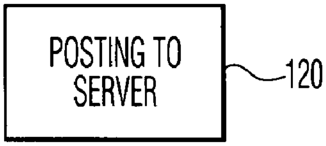
FIG. 11 shows posting by the client 70 to the server 71, in HTTP-format.

FIG. 11 shows posting by the client 70 to the server 71, in HTTP-format.

Posting to the server 71, in HTTP-format:

"POST http://tv/remoteaction.cgi HTTP/1.1
CONTENT TYPE=application/x-www-form-urlencoded
CONTENT LENGTH=9
channel=2"

In this example, the channel selection for channel two is posted.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. In a wireless communication system comprising a plurality of controllable electronic devices and a mobile station for communicating with one of said controllable electronic devices through a short-range wireless communication link, said mobile station comprising a display screen, a user input interface, and an access protocol browser operating in accordance with an access protocol, a method of remotely controlling said one controllable electronic device wherein prior to said requesting, checking whether said one controllable electronic device has access protocol capability, said method comprising:

through said short-range wireless communication link, said mobile station requesting said controllable electronic device to download data representative of a control interface associated with said one controllable electronic device;

downloading of said data in a data format interpretable by said access protocol browser; and displaying on said display screen of said data as control interface menu pages representative of said control interface, said access protocol browser navigating through said control interface menu pages.

2. A method as claimed in claim 1, comprising setting up of said short-range wireless communication link if said one controllable electronic device is in-range of said mobile station.

3. A method as claimed in claim 1, comprising storing of an identification of said controllable electronic device and of said downloaded data, and, upon breaking off of said link due to said controllable electronic device becoming out of range, verifying during a setting up of a next short-range wireless communication link with a next controllable electronic device whether said next controllable electronic device is said controllable electronic device of said broken link, and, if so, reusing said stored downloaded data.

4. A method as claimed in claim 1, wherein said data represent all control interface menu pages of said control interface.

5. A method as claimed in claim 1, wherein said data represent a part of all control interface menu pages, said part including a main menu page.

6. A method as claimed in claim 1, wherein said access protocol is a markup language reading and interpretation protocol and said data represent a markup language.

7. A method as claimed in claim 6, wherein said markup language reading and interpretation protocol is a wireless access protocol and said markup language is a wireless access protocol markup language.

8. A method as claimed in claim 6, wherein said markup language is HTML.

9. A method as claimed in claim 1, wherein a control interface menu page of said control interface menu pages comprises a plurality of selectable control parameters, and, upon selection of one of said plurality of selectable control parameters, said method comprises transmitting of said one control parameter to said one controllable electronic device, and, in said one controllable electronic device, effecting a control action on the basis of said one control parameter.

10. A method as claimed in claim 9, comprising running a markup language program at the one controllable electronic device, said one control parameter being transmitted in a data format interpretable by said markup language program.

11. A method as claimed in claim 10, comprising, from said markup language program, transmitting of an instruction to said mobile station to adopt a menu page state in accordance with a current control state of said one controllable electronic device.

12. A method as claimed in claim 10, wherein said requesting is done through transmission of a URL previously received from said one controllable electronic device, said URL identifying a start address of said data in said one controllable electronic device.

13. A method as claimed in claim 12, wherein said short-range wireless communication link is a Bluetooth link, and said access protocol is a wireless access protocol.

14. A method as claimed in claim 2, wherein said data comprises a current control state of said controllable electronic device.

15. A wireless communication system comprising:

a plurality of controllable electronic devices with control interfaces configured to control said controllable electronic devices, and with means for downloading data representative of a control interface corresponding to one of said controllable electronic devices;

a mobile station for remotely controlling said one controllable electronic device through a short-range communication link, said mobile station comprising display means, a user input interface, and an access protocol browser operating in accordance with an access protocol, said mobile station being configured to submit a request, through said short-range communication link, to said controllable electronic device to download said data wherein said mobile station comprises means to check whether said one controllable electronic device has access protocol capability, said means for downloading being configured to download said data in response to said request, in a format interpretable by said access protocol browser, said display means being configured to display said downloaded data as control interface menu pages representative of said control interface, and said access protocol browser being configured to navigate through said control interface menu pages.

16. A system as claimed in claim 15, wherein said access protocol is a markup language reading and interpretation protocol and said data represent a markup language.

17. A system as claimed in claim 15, wherein a control interface menu page of said control interface menu pages comprises a plurality of selectable control parameters, through said user input interface, a user selects one of said control parameters, said mobile station comprises means for transmitting said one control parameter to said one controllable electronic device, and said controllable electronic device comprises means for effecting a control action on the basis of said one control parameter.

18. A system as claimed in claim 17, wherein said mobile station comprises means for running a markup language program, said markup language program being configured to interpret said control interface menu pages.

19. A mobile station for remotely controlling, through a short-range communication link, of one of a plurality of controllable electronic devices comprised in a wireless communication system that comprises said mobile station, said plurality of controllable electronic devices comprising control interfaces configured to control said controllable electronic devices, and means for downloading data representative of a control interface corresponding to one of said controllable electronic devices, said mobile station comprising:

means to check whether said one controllable electronic device has access protocol capability, display means, a user input interface, and an access protocol browser operating in accordance with an access protocol, said mobile station being configured to submit a request, through said short-range communication link, to said one controllable electronic device to download said data, said access protocol browser being configured to interpret downloaded data, said display means being configured to display said downloaded data as control interface menu pages representative of said control interface, and said access protocol browser being configured to navigate through said control interface menu pages.

20. A mobile station as claimed in claim 19, wherein said access protocol is a markup language reading and interpretation protocol and said data represent a markup language.

21. A mobile station as claimed in claim 19, wherein a control interface menu page of said control interface menu pages comprises a plurality of selectable control parameters, through said user input interface, a user selects one of said control parameters, and said mobile station comprises means for transmitting said one control parameter to said one controllable electronic device.

22. A controllable electronic device, that, through a short-range communication link, is remotely controllable by a mobile station with an access protocol browser operating in accordance with an access protocol, said controllable electronic device comprising:

a control interface configured to control said controllable electronic device;

means for downloading, in response to a request issued by said mobile station, of data representative of said control interface, in a format interpretable by said access protocol browser; and means for effecting, in response to a control parameter that is selected from a control interface menu page generated by said access protocol browser from said downloaded data, and that is received from said access protocol browser, of a control action in said control interface.

* * * * *